May 17, 1960 R. J. COAR ET AL 2,936,999
TANGENTIAL BEARING SUPPORTS
Filed Dec. 7, 1956 3 Sheets-Sheet 1

INVENTORS
WILLIAM W. JACOBUS
RICHARD J. COAR
BY Vernon F. Hauschild
ATTORNEY

May 17, 1960  R. J. COAR ET AL  2,936,999
TANGENTIAL BEARING SUPPORTS
Filed Dec. 7, 1956  3 Sheets-Sheet 2

INVENTORS
WILLIAM W. JACOBUS
RICHARD J. COAR
BY Vernon F. Hauschild
ATTORNEY

May 17, 1960 R. J. COAR ET AL 2,936,999
TANGENTIAL BEARING SUPPORTS
Filed Dec. 7, 1956 3 Sheets-Sheet 3
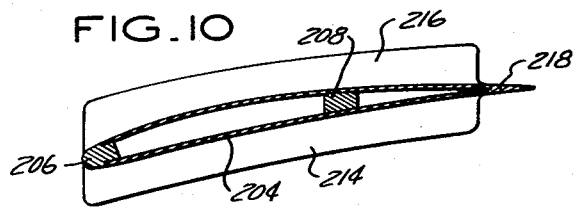
FIG.10
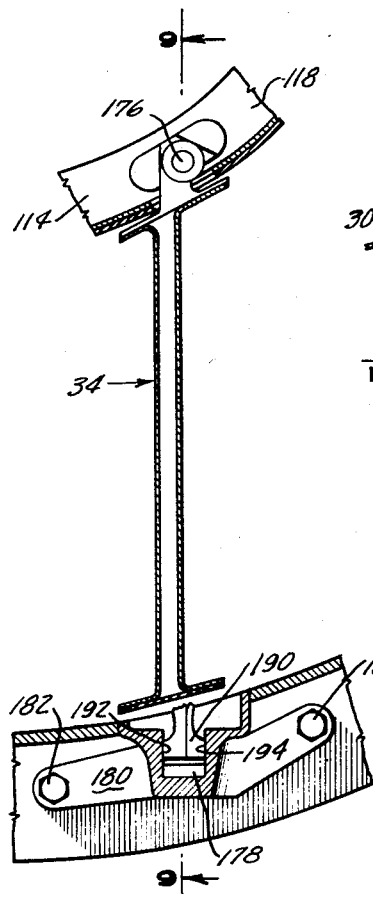
FIG.8
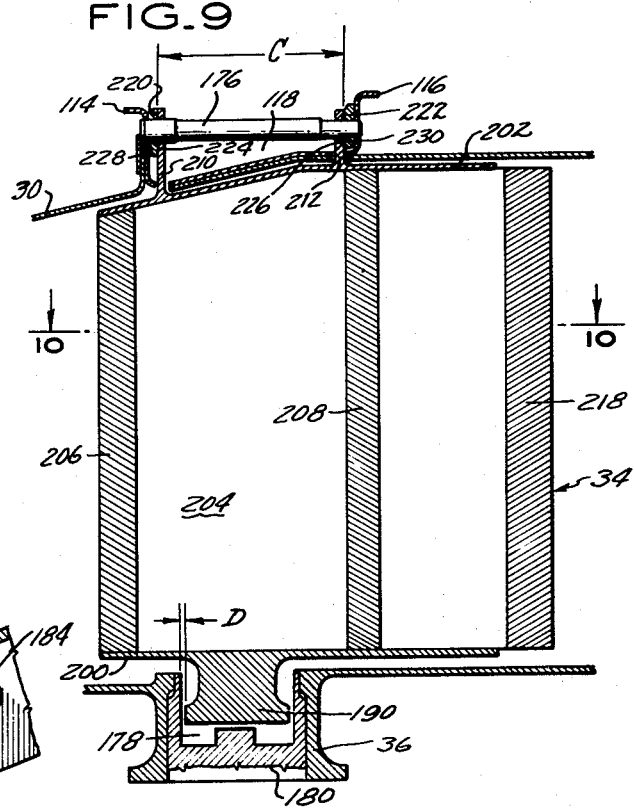
FIG.9
FIG.11
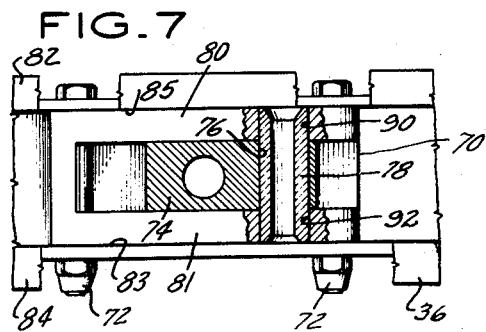
FIG.7
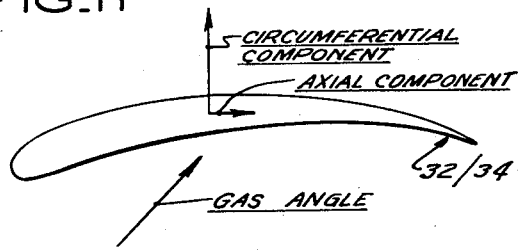
INVENTORS
WILLIAM W. JACOBUS
RICHARD J. COAR
BY Vernon F. Hauschild
ATTORNEY

United States Patent Office 2,936,999
Patented May 17, 1960

2,936,999
TANGENTIAL BEARING SUPPORTS

Richard J. Coar, West Hartford, and William W. Jacobus, Columbia, Conn., assignors to United Aircraft Corporation, East Hartford, Conn., a corporation of Delaware Application December 7, 1956, Serial No. 626,899

5 Claims. (Cl. 253—39)

This invention relates to means for supporting a shaft bearing within a powerplant outer case and more particularly to supporting a bearing such as a rear turbine bearing in a modern aircraft turbojet engine.

It is an object of this invention to minimize the effect of relative thermal expansion between the engine case and the much smaller bearing housing contained concentrically therein, by supporting the bearing housing relative to the engine case by means of bearing support rods which project from the outer case and engage the bearing support tangentially.

It is a further object of this invention to provide tangential bearing support rods, as described above, each of which support rods is pivotally attached to the engine case at its outer end in a plane perpendicular to and offset from the centerline of the support rod. The purpose of the offset pivot is to decrease the spring rate of the support rods thereby diminishing the stress loading in the parts joined by the support rods.

It is a further object of this invention to provide tangential bearing support rods which fully support the tailcone concentrically with respect to the engine housing in such a fashion that the tailcone is permitted or caused to rotate relative to the engine case with rotations and deflections of the support rods.

It is still a further object of this invention to provide tangential bearing support rods to support a bearing housing concentrically within an engine case and to fully support an engine tailcone therebetween and to further provide aerodynamic struts enclosing the support rods in the area between the engine tailcone and the outer case so as to reduce aerodynamic losses to the engine gases passing through this area and to shape and position the struts such that they perform a straightening function upon the gas.

It is still a further object of this invention to provide struts about the bearing support rods described above and to connect them to the engine tailcone such that all gas loads on the struts pass to the case through the bearing support rods.

It is still a further object of this invention to provide an aerodynamic strut surrounding the tangential bearing support rod, described above, which strut is pivotally attached to the engine tailcone so that it may pivot circumferentially with respect thereto and which strut is also attached at its outer end to the outer end of the support rod such that the strut assumes the tangential angle of the support rod and changes in tangential angle with the support rod as the support rod pivots and/or deflects with respect to the engine case and/or tailcone.

Other objects and advantages will be apparent from the specification and claims, and from the accompanying drawings which illustrate an embodiment of the invention.

In the drawings:

Fig. 7 is a fragmentary view taken along line 7—7 of Fig. 2.

Fig. 8 is a vertical section of the straightening vane shown in Fig. 2.

Fig. 9 is a view taken along line 9—9 of Fig. 8.

Fig. 10 is a view taken along line 10—10 of Fig. 9.

Fig. 11 is a cross-sectional view of an airfoil shape such as support rod strut 32 or turning vane 34 to illustrate the gas angle and the circumferential and axial gas load components placed upon the strut or the turning vane due to gas loading.

Figure 1:
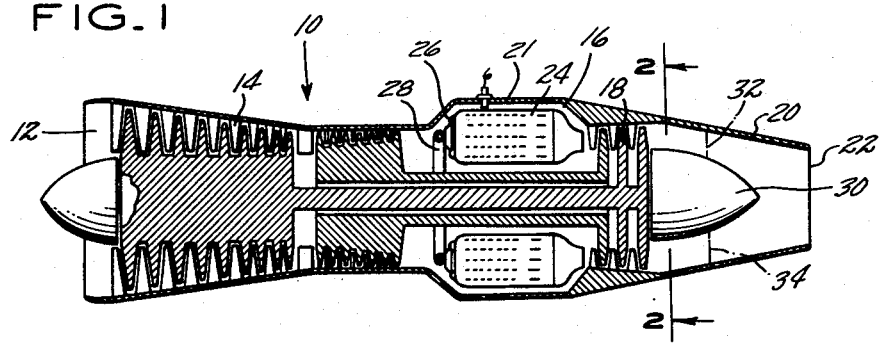
Fig. 1 is a cross-sectional view of a modern aircraft turbojet engine utilizing the subject matter of this invention in the vicinity of and in connection with turbine rear bearings.

Referring to Fig. 1, we see typical turbojet aircraft engine 10 comprising air inlet section 12, compressor section 14, combustion section 16, turbine section 18, exhaust section 20 and exhaust outlet 22. Air enters engine 10 through air inlet section 12 and is compressed as it is pumped through compressor section 14. The air is heated in combustion section 16 due to the combustion which occurs in combustion chamber 24. Fuel is introduced into combustion chamber 24 through fuel nozzles 26 which in turn receive fuel from fuel manifold 28. Fuel is supplied to fuel manifold 28 from a fuel pump (not shown). After leaving combustion section 16, the heated gases then pass through turbine section 18 in a power generating function and then pass through discharge section 20 and are discharged into the atmosphere through exhaust outlet 22. Engine tailcone 30 is located downstream of turbine 18 and is centrally located and concentric with discharge duct 20. In passing through discharge duct 20, the engine exhaust gases pass through the volume between discharge duct 20 and tailcone 30 and are guided in their passage therethrough by rear bearing support struts 32 and straightening vanes 34, both of which are described in greater particularity hereinafter.

Figure 2:
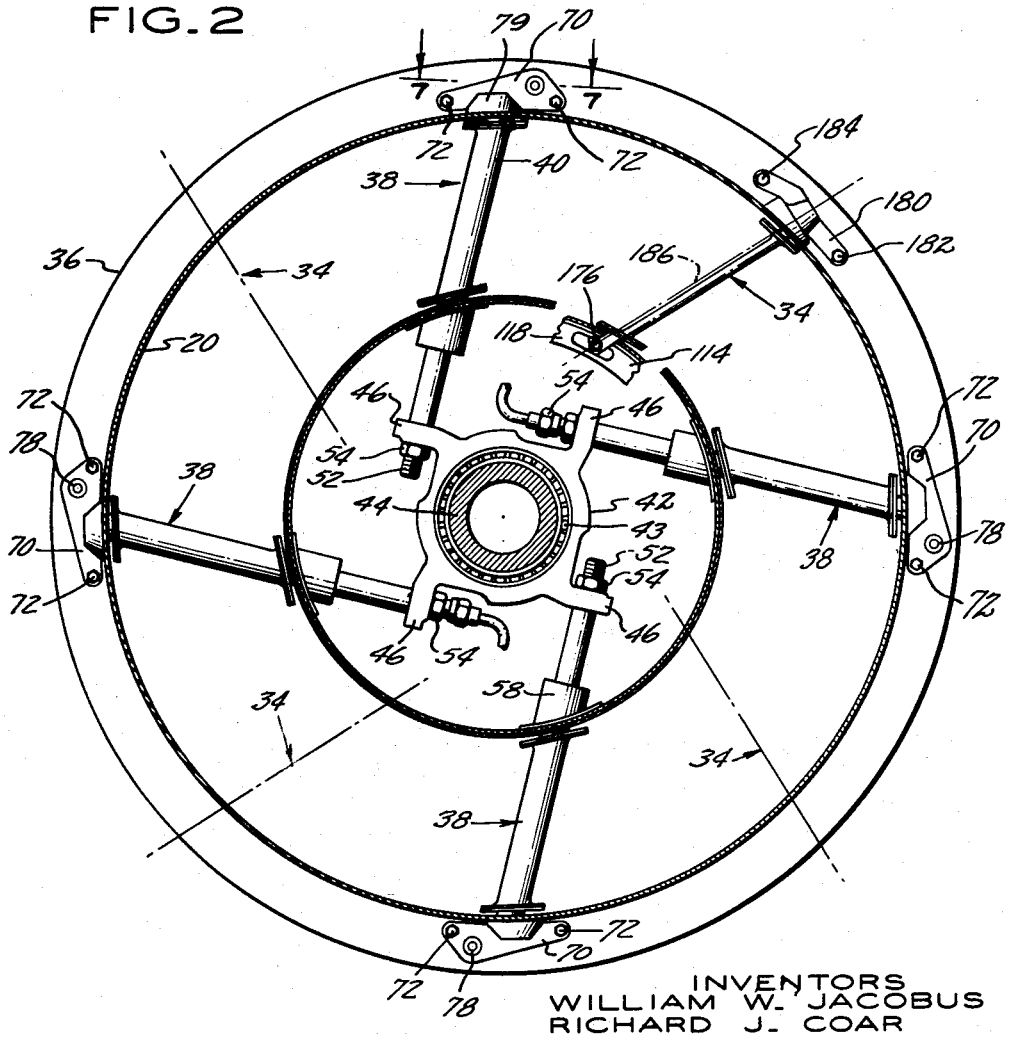
Fig. 2 is a view taken along line 2—2 of Fig. 1.

As it is highly desirable to have the exhaust gases from engine 10 discharged into the atmosphere through exhaust outlet 22 in an axial direction as opposed to in swirling fashion, straightening airfoil struts 32 and straightening vanes 34 are placed in the gas passage formed between outer case 21 and tailcone 30. When the engine gases are discharged from turbine section 18, they are discharged in a swirling fashion. In the past, to accomplish the desired axial flow, as opposed to a swirling flow, a large number of circumferential and closely spaced exit guide vanes have been placed just downstream of the turbine to accomplish the gas straightening function. The use of straightening strut 32 and straightening vanes 34 in spaced circumferential relation as shown in Fig. 2, eliminates the need for the tremendous number of exit guide vanes which were used previously. While Fig. 2 shows four struts 32 and four straightening vanes 34, it is obvious that any desired number of these struts and vanes could be selected depending upon the particular engine application. For instance, in a critical afterburner installation, where lamina gas flow into the afterburner is important, a greater number of straightening vanes 32 and/or struts 34 then would be necessary while a very few would be necessary in a non-afterburning or non-critical afterburning operation. The latter is the type of operation to which this subject matter relates mainly.

Figure 4:
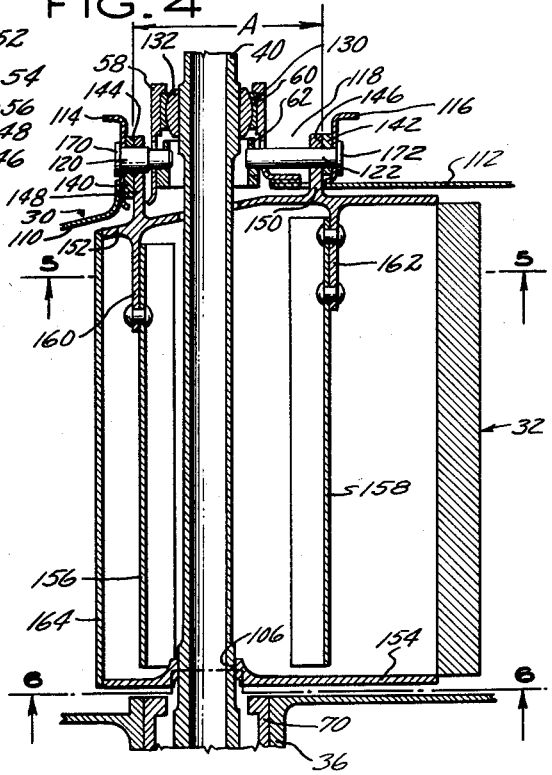
Fig. 4 is a view taken along line 4—4 of Fig. 3.

Referring to Figs. 2, 4 and 9, we see double axially spaced, radially outwardly and circumferentially extending flanges or support unit 36, while shown attached to discharge duct 20 is not necessarily so limited, and may be attached, if preferred, to the turbine case or to any part of the engine outer case 21. The purpose and function of support unit 36 is to position and support the outboard or exterior ends of the plurality of rear bearing support units 38 and to further support the outboard or exterior ends of the plurality of straightening vanes 34. While four equally spaced tangential rear bearing support units 38 and four equally spaced tangential straightening vanes 34 are shown, it should be borne in mind that our invention is not necessarily so limited and that any numbers of these units 38 and 34 could be selected depending upon the particular installation.

Figure 3:
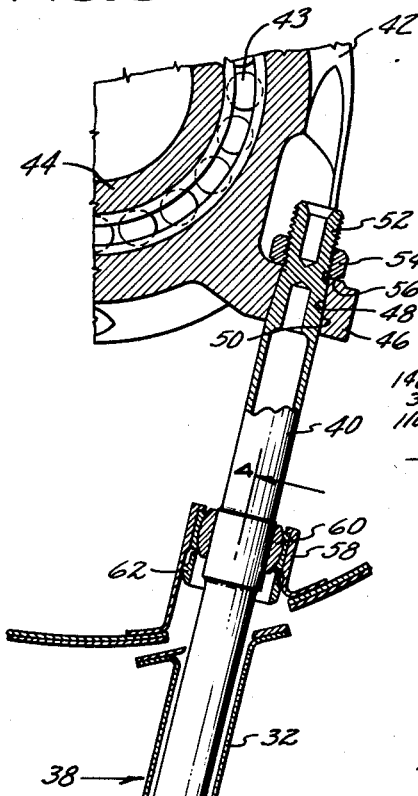
Fig. 3 is a vertical section of the support strut shown in Fig. 2.

Considering first the rear bearing support units 38, shown in Fig. 3, it should be noted that airfoil strut units 32 enclose only the rear bearing support rods 40. Each of the rear bearing support units 38 may be identical in construction or, as shown in Fig. 2, the rear bearing support units 38 shown in the three and nine o'clock positions may have tubing passed through them into the interior of engine tailcone 30 for lubricating, engine breathing or any other purpose. Tangential rear bearing support rods 40 project from external support unit 36, tangentially to bearing support 42. Bearing support 42 serves to support anti-friction bearing 43 which, in turn, supports rear turbine shaft 44. While support units 38 are shown in conjunction with a rear turbine bearing, it will be obvious to one skilled in the art that they are equally applicable to any other type of bearing supports. Lugs 46 project outwardly from rear bearing support 42 and have tapered holes 48 therein which tapered holes receive tapered shaft section 50 of support rod 40. Support rod 40 culminates in threaded area 52 at its inner end. Securing means such as nut 54 abut lug 46 at surface 56 to position the inner end of support rod 40. Support rod 40 supports engine tailcone 30 through support brackets 58 each of which is attached to the interior surface of tailcone 30 and which carries ball joint unit 60 so as to engage substantially the central section of support rod 40 pivotally to allow the necessary freedom of motion. Retaining ring 62 serves to hold ball and socket unit 60 in position between tailcone support bracket 58 and support rod 40. This central support bracket 58 and associated parts will be described further in connection with Fig. 4. In the area between tailcone 30 and exterior support unit 36, which constitutes a part of the engine case or housing 21, airfoil support strut 32 encloses and surrounds tangential support rod 40. As described in greater particularity later, airfoil shaped strut 32 serves the function of improving aerodynamic gas passage around support rod 40 and passing bearing and thrust loads to the outer support unit 36 through support rod 40.

Tangential support rod 40 is attached in offset pivotal relation to outer support unit 36. Support bracket 70 is attached to outer support unit 36 by securing means 72. Support rod 40 has attachment ear or lug 74 projecting substantially perpendicular from its outer end. Lug or ear 74 may be an integral part of rod 40 or my be a separate part attached thereto in any convenient fashion such as welding by means of corporating threads or the like. Lug or ear 74 extends substantially in a circumferential direction on each side of support rod 40 and contains offset pivot hole 76, the center of which is offset from and lies in a plane substantially perpendicular to the centerline of support rod 40. Pivot pin 78 passes through offset hole 76 and, as best shown in Fig. 7, is pivotally received by lands or ears 80 and 81 which project from support bracket 70. Support bracket 70 further has shank section 79 communicating with the engine interior. Still referring to Fig. 7, it will be noted that support bracket 70 extends between and engages throughout its full length of axially spaced flanges 82 and 84 of external support unit 36 and is connected thereto by support means 72. This full length contact between support bracket 70 and outer support unit 36 along surfaces 83 and 85 serves to axially support rods 40 and aid load transfer from support rods 40 to outer support 36. Ear or lug 74, which is attached to the outer end of support rod 40 is positioned between and engages throughout its full length ears 80 and 81 of support bracket 70 and is so positioned in relation thereto that offset hole 76 of ear 74 aligns with holes 90 and 92 of lands 80 and 81, respectively, such that pivot pin 78 may pass therethrough so as to pivotally connect, in offset fashion, support rod 40 to outer support unit 36 through ear 74 and support bracket 70. Flanges 82 and 84 of external support 36 serve to retain pivot pin 78 in axial position.

In modern aircraft engine experience, it has been found that the engine outer case 21, which encloses compressor section 14, combustion section 16 and turbine section 18, expands during the early moments of engine operation at a substantial rate because of the temperature to which it is raised due to the hot powerplant gases passing therethrough. This case expansion is particularly pronounced in the engine case area external of the turbine, that is, the area in which outer support 36 is located. This substantial expansion of powerplant outer case 21 in the vicinity of outer support 36 becomes troublesome with respect to the supporting of rear turbine bearing support 42, rear bearing 43 and rear turbine shaft 44 which are of relatively small diameter with respect to the diameter of outer support 36 and, further, because these parts such as bearing support 42 are not subjected to the high gas temperatures of the engine since cooling air from compressor section 14 is ducted and passed through the interior of tailcone 30, thereby cooling the parts contained within tailcone 30. The problem presented by both the difference in initial diameter and the difference in operating temperature between outer support 36 and bearing housing 42 is that, while bearing support 42 must be supported and positioned from outer support 36, to do so by any type of direct connection, such as radial support rods connecting bearing support 42 to outer support 36, would cause excessive stresses and strains to be set up in the radial rods, in bearing support 42 and in outer support 36. Experience has shown that fixed radial support rods cause the outer case 21 and outer support 36 to dimple inwardly at the points where the radial rod attaches to outer support 36. To compensate for the different rate of expansion which exists between bearing support 42 and outer support unit 36, a plurality of tangential support rods 40 are used which engage bearing support 42 tangentially and which are pivotally attached in offset fashion to engine case 21 through outer support 36. With this construction, the bearing support 42 and therefore bearing 43 and shaft 44 are held in concentric relation to outer support 36 and, when outer support 36 expands at a faster rate than bearing support 42, the radial outward expansion movement of case 36, which carries pivot pin 78 therewith, causes the pivoting of support rods 40 and the consequent clockwise rotation of bearing support 42. Due to the complete concentricity between bearing support 42, bearing 43 and shaft 44, the rotation of one relative to the other is in no way detrimental to the unit, as all three parts are still supported in concentric relation to one another and in concentric relation to outer support 36. Obviously, if tangential support rod 40 was not pivoted at its outer end, the differential expansion between outer support 36 and bearing support 42 would cause a bending moment in rod 40. Pivot pin 78 is offset from support rod 40 to decrease the spring rate of rods 40, that is, to permit deflection of rod 40 under less force than if rods 40 were not offset. Maximum deflection of rods 40 takes place at a point about ⅔ of the length of rod 40 from tailcone 30. By this means, loads are taken in support rod deflection rather than excessively loading other powerplant parts.

Referring again to Fig. 3, we see that support rod 40 has ring 94 shrunk about its outer periphery at its external end just inboard of ear 74. It will further be noted that ring 94 has a spherical external surface which engages with the inner surface of a sleeve 96 to form an airseal to prevent air from leaking from within powerplant 10 out into the atmosphere. Sleeve 96 has smooth cylindrical inner surface 98 which has spherical surface 100 on a portion of its outer surface which spherical surface 100 engages recessed cylindrical surface 102 of shank 79 of support bracket 70, which recessed cylindrical surface 102 is substantially concentric with the axis of tangential support rod 40. Pin 104 is received in ear 74 and bears against sleeve 96 to perform the function of preventing sleeve 96 from joining or locking within cylindrical surface 102 of shank 79 and from joining around ring 94.

Figure 6:
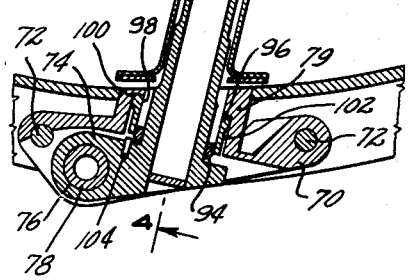
Fig. 6 is a view taken along line 6—6 of Fig. 4.
Figure 6:
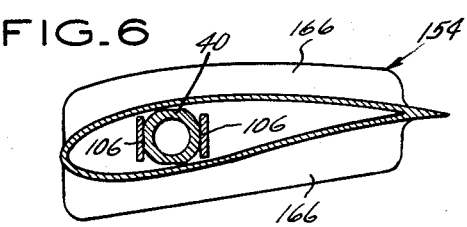

By way of cross-sectional shape, support rod 40 is of circular cross-section throughout almost all of its length interior of ear 74 excepting in the area inboard of the outer portion of strut 38 for a short distance in which area support rod 40 is of square or any selected flat surface cross-section. This is best shown in Fig. 6 at area 106. As previously stated, support rod 40 in area 50 is tapered in mating relationship to the tapered hole 48 in rear bearing lug 46.

Figure 5:
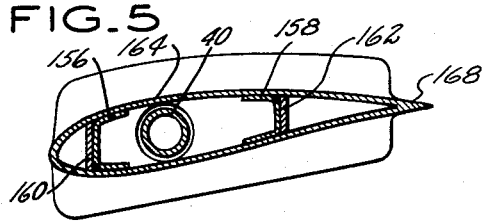
Fig. 5 is a view taken along line 5—5 of Fig. 4.

Fig. 4 shows a cross-sectional view through rear bearing support strut 32. It will be noted that the engine tailcone 30 is separated to permit support rod 40 and units of support strut 32 to pass therethrough such that the forward portion 110 of the engine tailcone 30, the inner portion of support strut 32, and the after portion 112 of tailcone 30 form a continuous duct. Inwardly directed brackets or flanges 114 and 116 are attached to tailcone sections 110 and 112, respectively, and form inwardly directed circumferential U-shaped channel 118 to serve as a support for strut 32 and a connection between tailcone 30 and support rods 40. Tailcone support bracket 58 projects substantially radially inward from the central portion of channel 118 and is supported in position by pins 120 and 122. Support bracket 58 houses concave spherical journal 130 which receives convex spherical support 132 in mating fashion to form ball joint 60. Ball joint 60 performs the function of pivotally engaging support bracket 58 and tailcone 30 to support rod 40. Ring 62 is retained in position by pins 120 and 122 and is spaced slightly radially outward of bushing 130 and serves the function of preventing socket unit 60 from falling out of support bracket 58. Spacer lugs 140 and 142 are welded to flanges 114 and 116 and, it is highly desirable that their adjacent surfaces 144 and 146 are spaced a carefully selected predetermined distance "A" apart such that ears 148 and 150 are received snugly therebetween. It may be necessary to finish surfaces 144 and 146 after the welding operation to insure that this critical spacing "A" is accomplished. Support strut 32 comprises inner support 152 and outer support 154 as well as central support brackets 156 and 158. Inner support 152 and outer support 154 are of substantially the same cross-sectional shape as best shown in Figs. 5 and 6. Considering inner support 152 (Fig. 4), we note that it has inwardly directed lugs 148 and 150 which mate in snug relation axially (dimension A) with lugs 140 and 142 of inwardly directed channel 118. In addition, inner support 152 has radially outwardly directed ears 160 and 162 which attach to U-shaped support brackets 156 and 158, as shown in Fig. 5. By way of construction of strut 32, inner support 152 may be welded to support channels 156 and 158. Then airfoil sheet 164 may be caused to flare out at its outer and inner ends, as best shown by skirt 166 in Fig. 6 to be welded to inner and outer supports 152 and 154 and also to support brackets 156 and 158 to form an airfoil section between the inner and outer supports 152 and 154, enclosing support rod 40. Airfoil sheet or section 164 may be of one-piece construction with the ends of the single sheet welded roughly together at line 168 to form the trailing edge of airfoil section 164 and the trailing edge of airfoil support strut 32. Pivot pins 120 and 122 pivotally connect support strut 32 to inner cone 30 such that support strut 32 is pivotable about pins 120 and 122 in a circumferential direction, but due to the snug axial fit between support strut 32 and tailcone 30 (dimension A) there is no axial deflection allowable, hence, all axial loading of bearing 42 and all thrust loading of the various associated parts are directed through support strut 32 and squared outer end of support rod 40 to the rugged external support unit 36. Retaining plates 170 and 172, which may be attached in any convenient way to flanges 114 and 116, respectively, perform the function of retaining pins 120 and 122 in position.

Now referring to straightening vane 34 as shown in Figs. 2, 8 and 9, we see that the inner end of support strut 34 is pivotally attached to inwardly directed channel 118 which extends radially inward from tailcone 30, in pivotal relation by means of pivot pin 176 and is received at its outer end in slidable relation within inwardly directed slot 178 of outer bracket 180. Outer bracket 180 is attached to outer support bracket 36 in any convenient fashion such as by support means 182 and 184. Inwardly directed recess 178 is symmetric about centerline 186, which centerline 186 is tangential to bearing support housing 42. Lug 190 projects externally from and is a part of straightening vane 34 and is received in loose relation within recess 178 such that it is free to move substantially radially inwardly and outwardly therewithin. It might be desirable to machine outer surfaces 192 and 194 of lug 190 in the form of a convex curve to permit not only inner and outward movement within recess 178 but also a pivotal action between recess 178 and lug 190.

Now referring to Figs. 8 and 9 we see that straightening vane 34 comprises outer portion 200, inner portion 202, airfoil section 204 and forward and after supports 206 and 208. Lug 190 may be integral with or attached to outer portion 200. Inner portion 202 has inwardly directed lugs 210 and 212 projecting therefrom to receive pivot pin 176. By way of fabrication, though not necessarily so limited, a frame may be made by welding outer and inner supports 200 and 202 to forward support 206 and after support 208. Two pieces of sheet metal may then be formed to have inner and outer skirts roughly as shown in Fig. 10 as skirts 214 and 216, which skirts are welded to the inner and outer supports while the two sheet metal pieces are welded to forward support 206 and after support 208 and are welded together to form the trailing edge of airfoil section 204 along line 218. In fashion similar to that described for strut 32, surfaces 220 and 222 must be a predetermined distance "C" apart so as to engage surfaces 224 and 226 of lugs 228 and 230 in snug axial relation such that straightening vane 34 is capable of transmitting axial loads, including thrust, to outer support structure 36 after clearance "D" between support 180 and lug 190 is reduced to contact between these parts. Lugs 228 and 230 may be welded to flanges 114 and 116, respectively, and their critical surfaces 224 and 226 may be machined after weldment to insure that the critical dimension "C" is maintained such that straightening vane 34 is received within tailcone 30 in snug axial relation. Pivot pin 176 passes through lugs 210, 212, 228, 230 and flanges 114 and 116 so as to pivotally attach in a circumferential direction, straightening vanes 34 to tailcone 30.

Now referring to Fig. 11 we see an airfoil shape which is symbolic of either straightening vane 34 or strut 32 with both the gas angle and the axial and circumferential component of gas loading imposed upon the airfoil section illustrated in vector fashion. Due to the fact that gas leaves the turbine in a swirling fashion, there is but a small axial vector component. It will be noted that there is a substantial circumferential gas loading vector or component. This is of importance in the construction shown, for in Fig. 9 it will be noted that there is a clearance "D" between lug 190 and the surfaces of support 180. This clearance permits greater ease of movement of lug 190 within cavity 178 since contact occurs only along surfaces 192 and 194. The surfaces 192 and 194 are available to take the large circumferential gas load component and transfer it to the outer support 36. Since straightening vane 34 is free floating axially at its outer end due to clearance "D," previously described, but since it is supported in substantial cantilever fashion at its inner end, this cantilever construction serves the function of transferring the slight axial gas load from straightening vane 34 to support rods 40. With respect to strut 32, it will be noted that there is a solid mechanical connection between both outer support 154 and inner support 152 to support support rod 40 and in this fashion both the axial and circumferential loads imposed by the gases on strut 32 are transferred to support rods 40 and thence to outer support 36.

In this fashion, all gas loads imposed upon either straightening vanes 34 or strut 32 are transferred through support rods 40, which are the sole support for inner cone 30 to engine case 21 through outer support 36.

It is to be understood that the invention is not limited to the specific embodiment herein illustrated and described, but may be used in other ways without departure from its spirit as defined by the following claims.

We claim:

1. Apparatus for supporting a shaft bearing concentrically within an engine case of substantially circular cross-section comprising a bearing housing of substantially circular cross-section surrounding and supporting the bearing, a plurality of circumferentially substantially equally spaced support rods of substantially equal length and each having an axis and engaging said housing tangentially at one of its ends and pivotally attached to said engine case at its other end in a location offset from the axis of the support rod.

2. Apparatus for supporting a shaft bearing concentrically within an engine case of substantially circular cross-section comprising a bearing housing of substantially circular cross-section surrounding and supporting the bearing, a plurality of lugs projecting from said bearing housing and each containing a tapered hole with an axis substantially tangent to the periphery of said bearing housing, an outer support ring attached externally to and concentric with the engine case, a plurality of circumferentially substantially equally spaced support rods of substantially equal length and each having an axis and passing at its inner end thru said tapered hole to fixedly engage said housing tangentially and extending tangentially therefrom, an ear projecting from the outer end of each of said support rods and having a pivot hole therein having an axis offset from and lying in a plane perpendicular to the axis of said support rod, and means to pivotally attach said support rod to said support ring thru said pivot hole.

3. Apparatus for supporting a shaft bearing concentrically within an engine case of substantially circular cross-section comprising a bearing housing of substantially circular cross-section surrounding and supporting the bearing, a plurality of lugs projecting from said bearing housing and each containing a tapered hole with an axis substantially tangent to the periphery of said bearing housing, an outer support ring attached externally to and concentric with the engine case comprising two axially spaced flanges, a plurality of circumferentially substantially equally spaced support rods of substantially equal length and each having an axis and passing at its inner end thru said tapered hole to fixedly engage said housing tangentially and extending tangentially therefrom, an ear projecting from the outer end of each of said support rods and having a pivot hole therein having an axis offset from and lying in a plane perpendicular to the axis of said support rod, a support bracket located between and attached to said flanges and having a shank section in communication with the engine case interior and further having lands each containing a hole aligned with said pivot hole, and a pivot pin passing thru said pivot hole and the holes of said lands to pivotally attach said support rod outer ends to said outer support ring.

4. Apparatus for supporting a shaft bearing concentrically within an engine case of substantially circular cross-section comprising a bearing housing of substantially circular cross-section surrounding and supporting the bearing, a plurality of lugs projecting from said bearing housing each having a hole therein having an axis substantially tangent to the periphery of said bearing housing, an outer support ring attached externally to and concentric with the engine case comprising axially spaced flanges located radially outward from said bearing housing, a plurality of circumferentially substantially equally spaced support rods of substantially equal length and each having an axis and each passing at its inner end thru one of said tangent holes to engage said housing tangentially and extending tangentially therefrom, means to attach said support rod inner ends to said bearing housing, a circumferentially extending ear projecting from the outer end of each of said support rods and having a pivot hole therein having an axis offset from and lying in a plane perpendicular to the axis of said support rod, a plurality of substantially circumferentially equally spaced support brackets located between and each engaging for its full circumferential dimension the adjacent surfaces of said spaced flanges, each of said support brackets having a shank section in communication with the engine case interior thru which one of said support rods extends and further having circumferentially extending axially spaced lands each engaging said ear throughout its circumferential dimension and each having a hole aligning with said pivot hole, a pivot pin passing thru said pivot hole and said land holes to pivotally attach in offset fashion said support rod outer ends to said outer support, and means to seal between said support rod and said shank section.

5. An engine having a case of substantially circular cross-section in combination with apparatus for supporting a shaft bearing within said engine case comprising a bearing housing of substantially circular cross-section surrounding and supporting the bearing, a plurality of support rods each having an axis and (to support said bearing housing within the engine case) fixedly engaging said housing tangentially and pivotally attaching to said engine case in a location offset from the axis of the support rod.

References Cited in the file of this patent

UNITED STATES PATENTS

| | | |
|---|---|---|
| 1,326,869 | Junggren | Dec. 30, 1919 |
| 2,516,671 | Bowers | July 25, 1950 |
| 2,587,345 | Lombard | Feb. 26, 1952 |
| 2,616,662 | Mierley | Nov. 4, 1952 |
| 2,724,621 | Kenney | Nov. 22, 1955 |
| 2,803,505 | Oberholtz | Aug. 20, 1957 |

FOREIGN PATENTS

| | | |
|---|---|---|
| 882,330 | France | Feb. 22, 1943 |